(12) United States Patent
Hodgkins et al.

(10) Patent No.: US 11,193,549 B2
(45) Date of Patent: Dec. 7, 2021

(54) BRAKE CALIPER BODY AND METHOD OF MANUFACTURE OF A BRAKE CALIPER BODY

(71) Applicant: ALCON COMPONENTS LIMITED, Tamworth (GB)

(72) Inventors: Stephen Hodgkins, Tamworth (GB); Richard Humble, Tamworth (GB); Andrew Smith, Tamworth (GB)

(73) Assignee: ALCON COMPONENTS LIMITED, Tamworth (GB)

( * ) Notice: Subject to any disclaimer, the term of this patent is extended or adjusted under 35 U.S.C. 154(b) by 737 days.

(21) Appl. No.: 15/568,998

(22) PCT Filed: Apr. 27, 2016

(86) PCT No.: PCT/GB2016/051188
§ 371 (c)(1),
(2) Date: Oct. 24, 2017

(87) PCT Pub. No.: WO2016/174426
PCT Pub. Date: Nov. 3, 2016

(65) Prior Publication Data
US 2018/0142746 A1    May 24, 2018

(30) Foreign Application Priority Data
Apr. 27, 2015   (GB) ...................... 1507130

(51) Int. Cl.
*F16D 65/18*   (2006.01)
*B22F 5/10*    (2006.01)
(Continued)

(52) U.S. Cl.
CPC ............... *F16D 65/18* (2013.01); *B22F 5/10* (2013.01); *B22F 10/20* (2021.01); *B33Y 80/00* (2014.12);
(Continued)

(58) Field of Classification Search
CPC ........ F16D 65/18; F16D 55/22; F16D 55/225; F16D 2055/0016; F16D 2250/0015;
(Continued)

(56) References Cited

U.S. PATENT DOCUMENTS

| | | | |
|---|---|---|---|
| 4,381,336 A * | 4/1983 | Ostwald ................. | B22D 19/00 188/370 |
| 2007/0170020 A1* | 7/2007 | Halasy-Wimmer ......................... | F16D 55/227 188/73.43 |

(Continued)

FOREIGN PATENT DOCUMENTS

| CN | 10347031 | 12/2013 |
|---|---|---|
| DE | 10 2013 219250 | 3/2014 |

(Continued)

OTHER PUBLICATIONS

Anonymous, "Tu Wien Racing—Here are our topology optimized front and . . . ," (May 5, 2014), retrieved from the Internet: https://www.facebook.com/tuwracing/posts/10152229866921696.

(Continued)

*Primary Examiner* — Robert A. Siconolfi
*Assistant Examiner* — San M Aung
(74) *Attorney, Agent, or Firm* — Barnes & Thornburg LLP (57) ABSTRACT

A brake caliper comprising a body manufactured from ALM and having a skinned lattice structure. A method of designing and forming said brake caliper.

15 Claims, 6 Drawing Sheets

(51) Int. Cl.
    *B33Y 80/00*     (2015.01)
    *F16D 55/22*     (2006.01)
    *B22F 10/20*     (2021.01)
    *F16D 55/225*     (2006.01)
    *F16D 55/00*     (2006.01)
    *B33Y 10/00*     (2015.01)

(52) U.S. Cl.
    CPC .......... *F16D 55/22* (2013.01); *F16D 55/225* (2013.01); *B33Y 10/00* (2014.12); *F16D 2055/0016* (2013.01); *F16D 2250/0015* (2013.01); *Y02P 10/25* (2015.11)

(58) Field of Classification Search
    CPC ......... B22F 3/1055; B22F 5/10; B33Y 80/00; B33Y 10/00; Y02P 10/295
    USPC ....................................... 188/73.43
    See application file for complete search history.

(56) References Cited

U.S. PATENT DOCUMENTS

| | | | |
|---|---|---|---|
| 2009/0127801 A1* | 5/2009 | Heikkila | ............... A01K 85/00 |
| | | | 277/591 |
| 2010/0038190 A1 | 2/2010 | Renz et al. | |
| 2010/0276236 A1 | 11/2010 | Kim et al. | |
| 2013/0001837 A1 | 1/2013 | Goehler et al. | |
| 2015/0017013 A1* | 1/2015 | Tozzi | ....................... F01D 5/18 |
| | | | 416/227 R |

FOREIGN PATENT DOCUMENTS

| | | | |
|---|---|---|---|
| JP | 08035530 | * | 2/1996 |
| WO | WO 2008/046386 | | 4/2008 |
| WO | WO 2013/124314 | | 8/2013 |
| WO | WO 2015/006471 | | 1/2015 |

OTHER PUBLICATIONS

Search Report issued in App. No. GB1507130.1 (dated Oct. 26, 2015).

Search Report and Written Opinion issued in App. No. PCT/GB2016/051188 (2016).

* cited by examiner

BRAKE CALIPER BODY AND METHOD OF MANUFACTURE OF A BRAKE CALIPER BODY

CROSS REFERENCE TO RELATED APPLICATIONS

This application is a U.S. nationalization under 35 U.S.C. § 371 of International Application No. PCT/GB2016/051188, filed Apr. 27, 2016, which claims priority to United Kingdom Patent Application No. 1507130.1, filed Apr. 27, 2015. The disclosures set forth in the referenced applications are incorporated herein by reference in their entireties.

The present invention is concerned with a brake caliper body and a method of manufacture for such a body. More specifically, the present invention is concerned with a brake caliper body having various features manufactured by additive layer manufacturing (ALM).

Brake calipers are well known in the art. Such calipers are arranged to actuate a pair of opposed brake pads to clamp a brake disc therebetween. Clamping of the brake disc retards motion of a vehicle to which the caliper is attached. Brake calipers come in various forms. For example pin-slider type calipers utilise a cylinder or cylinders on a single side of the disc to advance one of two opposed pads. Once the pad is in contact with the disc, the caliper (which is slidably mounted for movement in the direction of actuation) slides such that the opposing pad also contacts the disc to clamp it between the pads. Opposed-piston type calipers, which are more common in motorsport, have a static caliper with two opposed banks of cylinders, each of which advances a respective brake pad. As such, the caliper remains static, but the disc is clamped between two moving pads, In both cases, the general principle is the same—hydraulic pressure is increased in a cylinder to force two brake pads together to clamp a disc.

Known calipers comprise a brake caliper body which provides the strength and stiffness required to react the forces experienced under braking. The caliper body typically has two limbs, one either side of the plane of the brake disc, each limb housing the brake cylinders with associated pistons. Brake pads are mounted on the inner facing sides of the caliper body for advancement towards the disc by pistons within the cylinders. The limbs are connected by one or more bridge members extending across the disc. Hydraulic fluid passages are attached to, and machined into, the caliper body to supply hydraulic brake fluid to the cylinders. For example in a known brake caliper, an external hydraulic conduit is provided on the radial outer surface of one of the bridge members spanning the caliper. The conduit is placed in fluid communication with a passage drilled into the limb extending to the cylinder.

As well as the supply of hydraulic fluid, calipers must be able to withstand the reaction forces of braking without significant deformation—they must be stiff. The clamping force on the disc results in an axial reaction which tends to splay the limbs apart. The braking force (i.e. friction between the brake disc and the pads) must also be reacted by the caliper, and its attachment to the vehicle. This tangential braking force tends to apply a shear force to the caliper.

Brake caliper bodies tend to be mounted to the vehicle at the inboard limb, which is known as the mounting side limb. The opposing limb is known as the non-mounting side limb.

Brake calipers tend to get very hot in use due to the friction between the pads and the disc under braking. Therefore cooling fluid channels may also be machined into the caliper body for the communication of cooling fluid, be that air, water or specific coolant around the brake caliper.

Because of the need for brake caliper bodies to react the forces of braking, they are typically cast forged or machined from solid billet, and even with subsequent machining operations remain heavy. They are also typically constructed from metal materials (selected to withstand the harsh braking environment, and to provide the required stiffness). Metal is also able to conduct heat away. A problem with such materials is that they are very heavy, and machining the required cooling channels and cylinder bores takes time, energy and wastes raw material. These channels need to be drilled straight, causing significant limitations on the paths they can take. The internal geometry of such channels is also restricted by drilling techniques, meaning that the resulting shapes are not ideal for fluid flow. Further, the constant need to reduce weight creates calipers with many open cavities, which can lead to entrapment of e.g. stones, which can cause problems in use.

It is the aim of the present invention to overcome, or at least mitigate, the above problems.

According to the present invention there is provided a brake caliper formed by additive layer manufacturing, said caliper comprising a body formed at least in part by a three-dimensional lattice having at least a partial skin.

In this application the term "skin" is intended to mean a portion having a bulk density of substantially 100% of the material density from which it is formed. The term "lattice" is intended to mean a portion having a bulk density of 50% or less of the material density from which it is formed.

Advantageously, the provision of a skinned lattice results in a strong, stiff, yet light body which can conduct thermal energy. The skin may be external or internal of the body.

Preferably the lattice is substantially open cell and comprises a drain orifice in communication with the open lattice to allow egress of manufacturing material therefrom. In lattices with a bulk density over 50%, egress of manufacturing material can be impaired. In some cases, it is necessary for the skin to be solid, i.e. c. 100% bulk density, for example where the skin defines a fluid passageway. In other cases, the skin may be less than 100% bulk density but it will be above 90% bulk density.

Alternatively, the lattice may be closed cell.

The lattice may be regular, or irregular.

Preferably the skin defines one or more of a piston bore, a slideway, an abutment for a brake pad, a mounting pad of an upright, a bearing pad for a screw fastener, an exterior surface visible in use, an internal fluid passage, a seat for a fluid seal, a threaded bore, an unthreaded bore.

The lattice may define voids of different volume, or of the substantially the same volume. At present, conventional manufacturing methods make it very difficult to remove low stressed material sitting inside higher stressed sections. As they are in the middle of a volume of material which must remain present, machine tools such as CNC machines cannot reach the low stress material without compromising the higher stressed material. In the present invention, these low stress areas are filled with a lattice giving some stiffness but much less weight than conventional calipers.

Preferably a substantial proportion of said voids are defined by concave surfaces.

The voids have a percentage void volume greater than 50% of the region of the caliper which comprises the lattice. Preferably, the voids have a percentage void volume of at least 70%, in other words the bulk density of the lattice is 30% or less. Most preferably, the voids have a percentage void volume of 90% (a lattice bulk density of 10%).

Preferably said lattice is defined by lattice elements which may take the form of one or more of columns, pillars, dendritic forms, honeycomb structures, body centred cubic structures or gyroid structures.

Preferably said lattice elements have a minimum cross-sectional area of 1 mm$^2$.

The ALM process often requires support structures to support part of the structure during manufacture which are removed later. By careful design, one or more of the lattice elements may perform a dual function of providing support during the additive layer manufacturing process and acting as structural support once completed.

According to a second aspect of the invention, there is provided a method of forming a brake caliper of metal powder by ALM, said method comprising:

providing a powder bath, fusing powder in said bath, layer by layer, according to a digital electronic record of a caliper body according to any preceding claim.

According to a third aspect of the invention, there is provided a method of designing a brake caliper for manufacture by ALM comprising the steps of:

providing an FE (finite element) model of a brake caliper body;

providing boundary conditions representing loading in use;

running an FE simulation subjecting the FE model to the boundary conditions;

selecting areas of the brake caliper body to incorporate an internal lattice structure based on the stresses simulated by the FE simulation.

FE simulation can be coupled with a process known as structural optimisation to produce a structurally optimised shape for a given function in a given space envelope. This process is known in brake caliper design. Coupling FE simulation and structural optimisation with ALM expands the opportunities for optimised design still further. At present, structural optimisation typically assumes use of solid material of 100% density. This typically produces calipers with an I-beam structure having very thin solid webs with through holes in low stress areas and thicker solid beams in high stress areas. The thin web areas though optimised for stress may not be capable of being made by conventional methods and so often the designer has to thicken those sections to enable manufacture resulting in a heavier than necessary caliper.

When using ALM, structural optimisation is not limited to using solid material. Instead, the bulk density of a region can be selected according to structural need. Where previously a structurally optimised caliper design may have suggested a thin web taking up 10% of the volume of a region which then needed to be thickened for manufacture, use of a three dimensional skinned lattice enables the whole region to be filled with a lattice having a bulk density of 10%. The whole available space envelope can be used with low stressed areas filled with low bulk density regions of skinned lattice and higher stressed areas filled with solid material.

Typically, a lattice filled region may be up to ten times as thick as an equivalent region in a structurally optimised conventional caliper yet weigh the same.

Preferably high stress areas are provided with solid metal, and areas with stresses below a threshold value are provided with a lattice.

Preferably, the step of selecting areas of the caliper body to incorporate an internal lattice structure, includes the step of designing a lattice structure comprising lattice elements, at least one of which lattice elements acts to support part of the body during additive layer manufacturing and which provides structural support after completion of manufacture.

An example caliper in accordance with the present invention will now be described with reference to the following figures.

Figure 1:
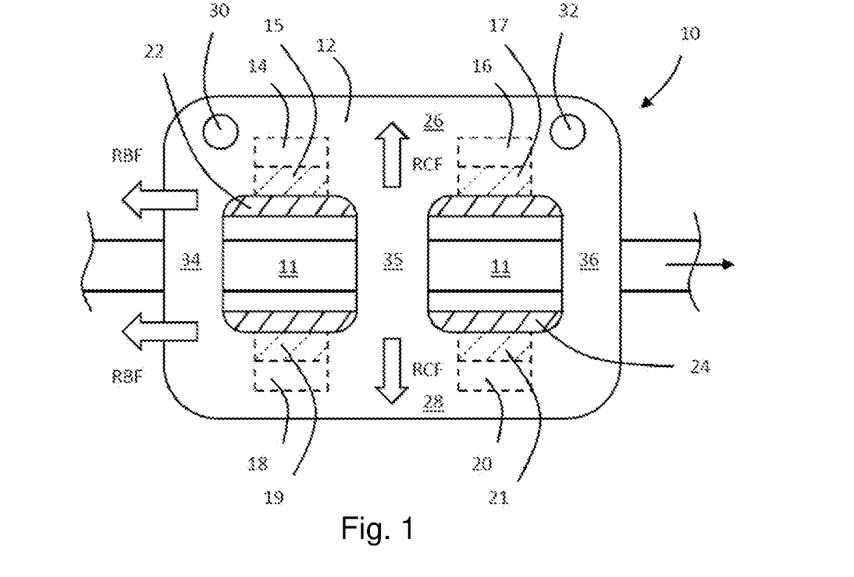
FIG. 1 is a top view of a known brake caliper.
Figure 2:
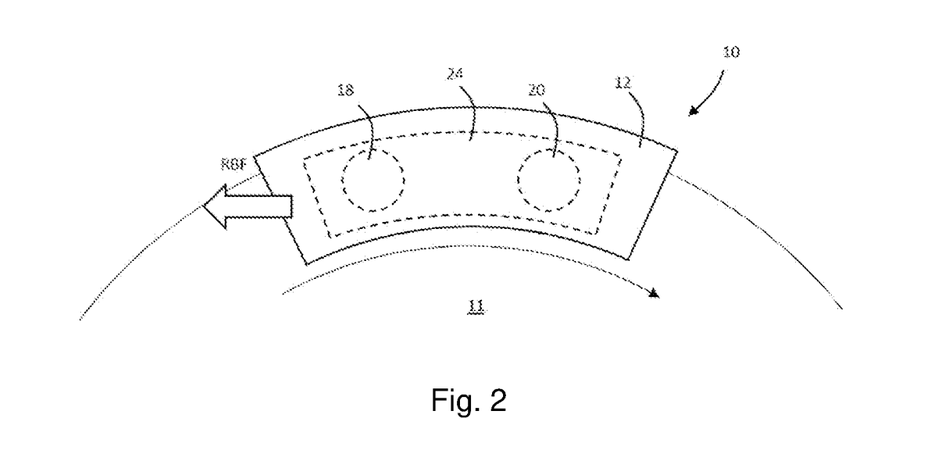
FIG. 2 is a side view of the caliper of FIG. 1.

Referring to FIGS. 1 and 2, there is shown a brake caliper 10. The brake caliper 10 sits astride a brake disc 11. The caliper 10 comprises a caliper body 12 defining four cylinders 14, 16, 18, 20, respective pistons 15, 17, 19, 21 disposed within each cylinder and two opposed brake pads 22, 24 either side of the disc 11.

The caliper body 12 has a mounting side limb 26 and a non-mounting side limb 28. The mounting side limb comprises mounting holes 30, 32 for attachment to a vehicle. The mounting side limb 26 and non-mounting side limb 28 are joined by two end bridge members 34, 36 and a central bridge member 35. The bridge members 34, 35, 36 span the disc 11 in use as shown in FIG. 1.

In the mounting side limb 26 there are disposed the cylinders 14, 16 containing the pistons 15, 17 which are arranged to urge the pad 22 towards the disc 11. Similarly, on the non-mounting side limb 28 there are disposed the cylinders 18, 20 containing the pistons 19, 21 which are arranged to urge the pad 24 towards the disc 1. Hydraulic pressure is supplied to the cylinders 14, 16, 18, 20 in order to effect braking.

When the brake is applied, the clamping force causes a reaction RCF in the axial direction which tends to splay the limbs 26, 28. The friction of the pads 22, 24 on the disc 11 results in a reaction RBF in the tangential direction.

Figure 3A:
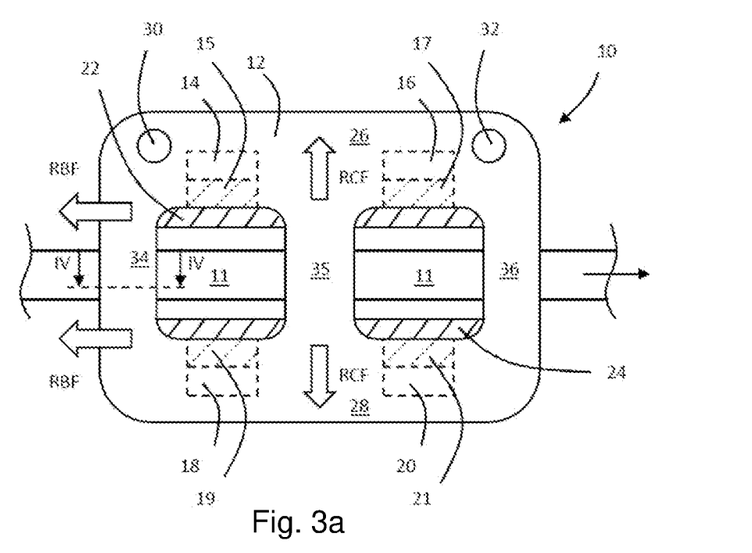
FIG. 3a is a top view of a first embodiment of a caliper in accordance with the present invention.
Figure 3B:
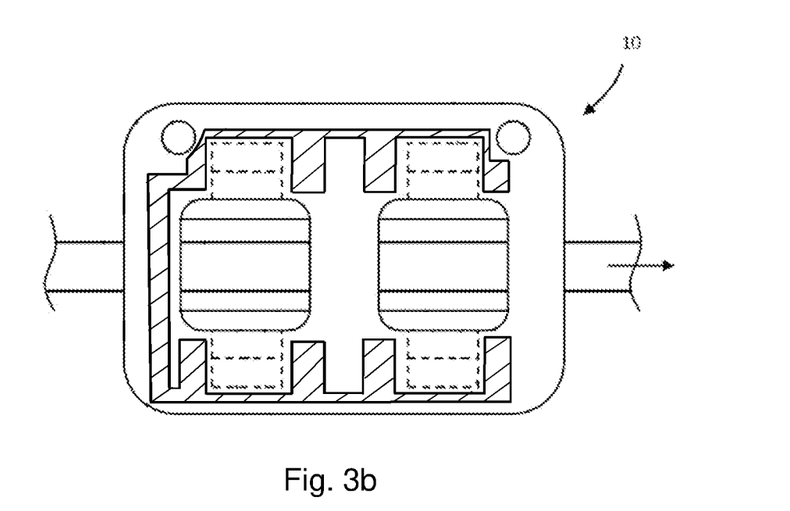
FIG. 3b is a simplified view of FIG. 3a showing the regions of the caliper formed from skinned lattice.
Figure 4:
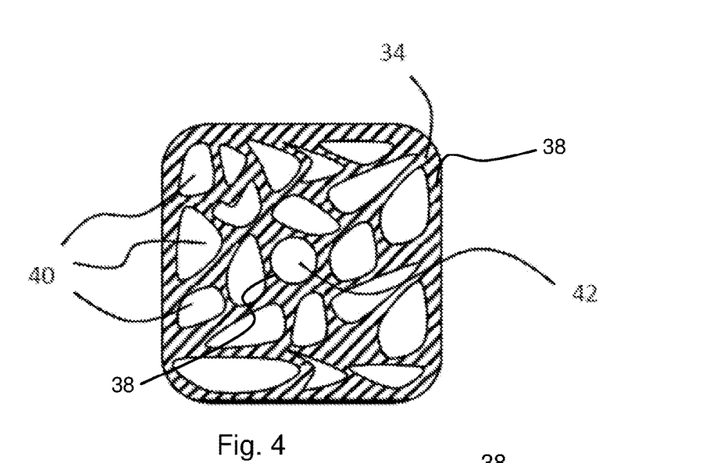
FIG. 4 is a section view of a part of the caliper of FIG. 3b along line IV-IV.

Turning to FIGS. 3 and 4, there is shown a brake caliper in accordance with the present invention. The same reference numerals apply to FIGS. 3 and 4 as they do to FIGS. 1 and 2.

The caliper body 12, instead of being a solid homogenous material has parts formed from a skinned lattice structure. Referring to FIG. 4, which is a cross section along line IV-IV in FIG. 3a, the end bridge 34 comprises a solid, uninterrupted outer skin 38 which outwardly has the same appearance as a prior art caliper. Within the section however a lattice structure is provided comprising a plurality of lattice elements defining a plurality of cavities or voids 40. The cavities 40 are connected and form an open-cell structure within the caliper body.

In the centre of the section of the bridge member 34 there is provided a hydraulic fluid conduit 42 passing from the mounting side limb 26 to the non-mounting side limb 28. Pressurised hydraulic fluid from the vehicle brake system is conveyed along the conduit 42. This conduit connects to cylinders 14, 16, 18, 20 so that all cylinders are pressurised.

This skinned lattice structure runs throughout the caliper body 12 in the cross-hatched regions of FIG. 3b. In the embodiment shown, the voids account for approximately 50% of the total volume enclosed by the skin 38 in the region of the caliper formed from lattice. We have found that bulk densities much above 50% can impede the removal of unused powder manufacturing material.

Figure 5:
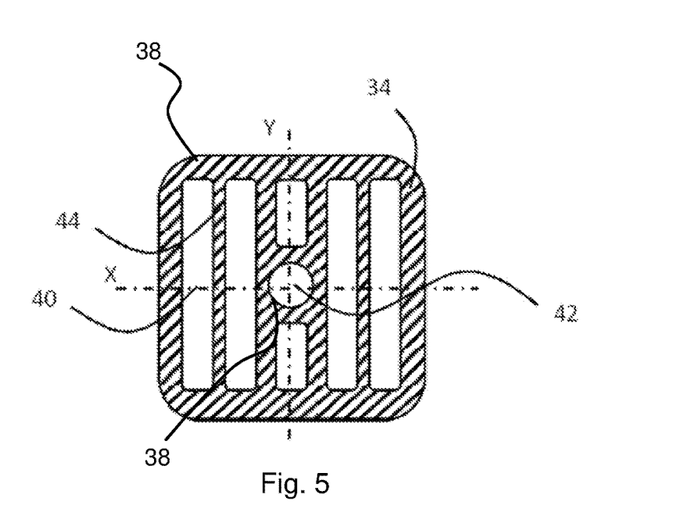
FIG. 5 is a section view similar to FIG. 4 of a second embodiment.

Referring to FIG. 5, an alternative to the section of FIG. 4 is shown in which the open cell irregular cavity lattice is replaced with an open-cell regular cavity lattice. Each cavity 40 is elongate and leaves columns 44 of caliper material therebetween. In this manner, heterogeneous properties can be obtained. The bending stiffness of the section of FIG. 5 is higher about axis X than axis Y. It will be noted that the conduit 42 is still present.

Figure 6:
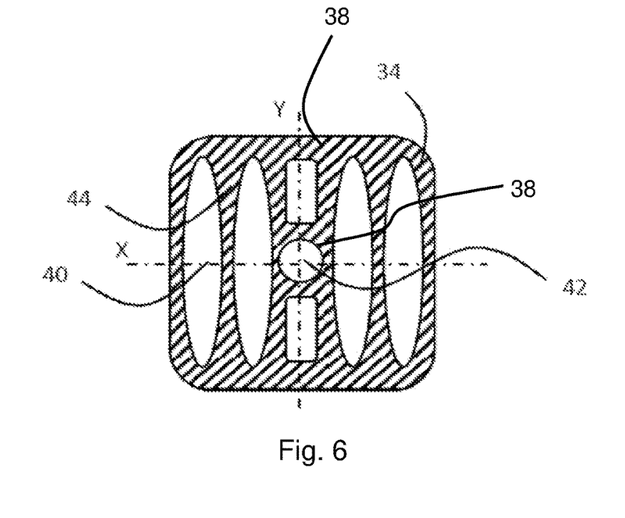
FIG. 6 is a section view similar to FIG. 5 of a third embodiment.

A further embodiment is shown in FIG. 6, in which the columns 44 are tapered to be thinnest in the centre of the cross-section.

Caliper bodies having the afore-described skinned lattice are manufactured using additive layer manufacturing (ALM)—specifically laser sintering, either by direct deposit laser sintering or by metal powder bed laser sintering.

In particular, the additive layer manufacturing may be incorporated by a direct deposit laser sintering process, in which metal powder is directed onto the work piece directly at the focus of a laser beam. Direct deposit laser sintering does not require a bed of metal powder to be deposited on a surface, but can fuse metal powder dynamically onto the substrate.

In detail, a laser beam is focused on the surface of a substrate and scans along the surface in a particular pattern that resembles the structure of the caliper body or body parts to be produced. Metal powder is delivered through a powder nozzle, which creates a gas flow arranged coaxially with the laser beam that falls into a molten pool created in the focus of the laser beam. A track of deposited metal is formed as a result of the continuous melting of the metal powder and solidification of the molten pool once the laser beam has moved on.

The process of additive layer manufacturing may be used to produce the entire brake caliper or to add specific structures to cast or machined body parts. For example, it is feasible to produce the cylinder housing portions by virtue of a casting or machining process and connect the cylinder housing portions by means of bridges manufactured in an additive layer manufacturing process.

In an alternative embodiment, metal powder bed laser sintering, in which a laser beam is directed onto a bed of metal powder can be implemented. In this embodiment, parts of the metal powder bed, which are subject to the heat of the laser beam, are fused to form solid metal while some of the powder remains unused. Evidently in order to release the unused powder from the cavities shown, they are open cell, and provide a drain hole to allow the unused powder to exit after manufacture. The so recovered unused powder can be recycled in another layer of the caliper body. Typically, the caliper body is shaken and/or blown with gas to loosen and release unused powder.

Figure 7:
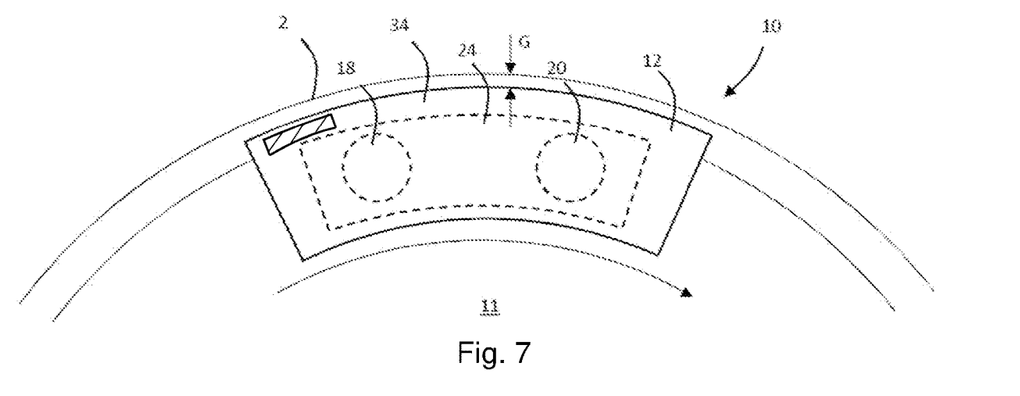
FIG. 7 is a side view of a fourth embodiment of a caliper in accordance with the present invention.

Turning to FIG. 7 there is shown a further caliper 10 in accordance with the present invention. The caliper 10 is shown inside a wheel 2. The caliper body 12 comprises a lattice structure as described above. The outer surface of the caliper body 12 (i.e. the skin 34) is dimensioned to leave a small clearance gap G with the inside of the wheel 2. The gap G is selected to allow the minimum risk of stone ingestion between the caliper body 12 and the wheel 2. It will be noted that because the density of the caliper body 12 can be tailored by altering the internal lattice structure, making a larger caliper to provide a small clearance to avoid stone ingestion or entrapment does not result in a significantly heavier caliper. The cross-hatched region in FIG. 7 comprises skinned lattice with a bulk density of 10%.

Figure 8:
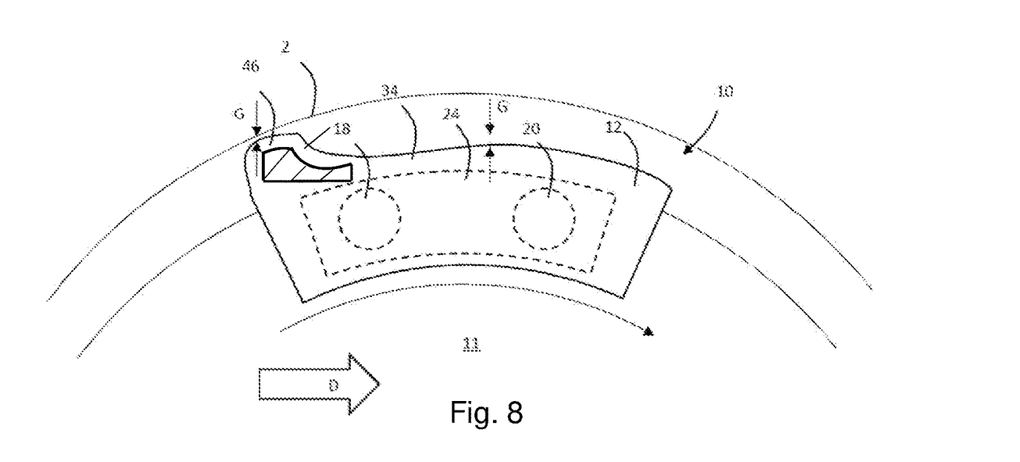
FIG. 8 is a side view of a fifth embodiment of a caliper in accordance with the present invention.

Turning to FIG. 8 there is shown a further caliper 10 in accordance with the present invention. The caliper 10 is shown inside a wheel 2. At a leading end of the caliper (vehicle direction of travel D is shown) the caliper body 12 has an integral stone shield 46. The shield 46 provides a tight clearance gap G against the wheel 2 where the disc 11 enters the caliper 10 to avoid stone entrapment. The shield extends across the leading bridge member and has a smooth outer skin with an internal lattice such that its weight is reduced. Again, the cross-hatched region in FIG. 8 is skinned lattice with a lower bulk density.

Figure 9:
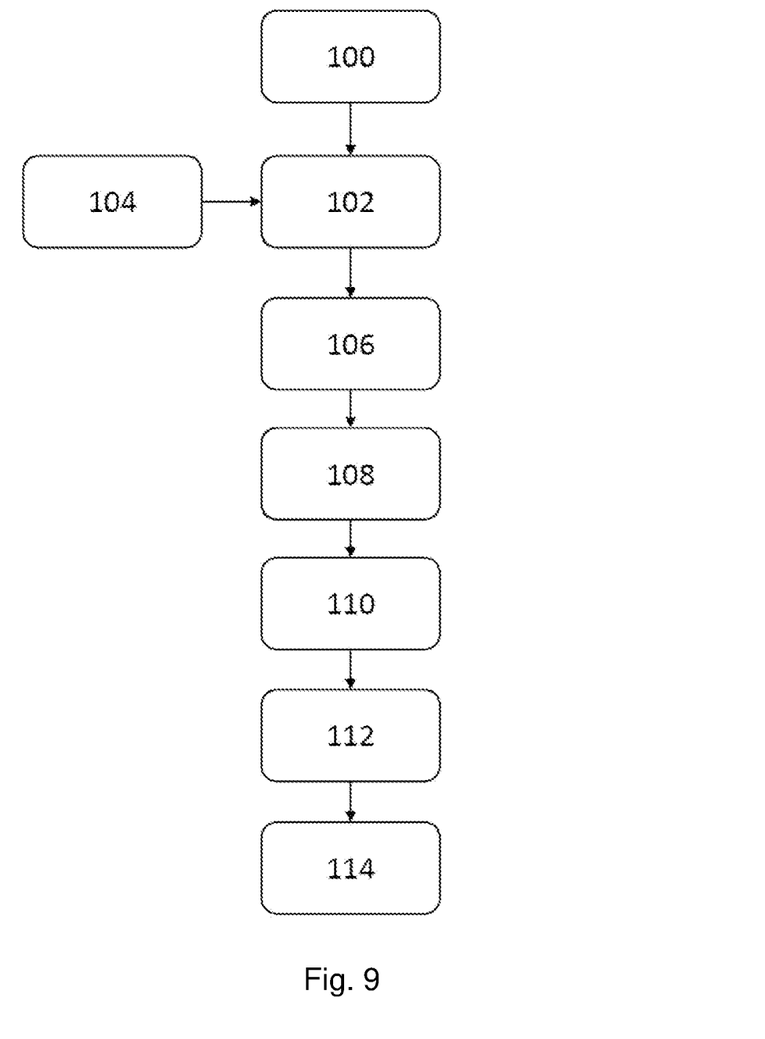
FIG. 9 is a flow chart representing a method of manufacture of a caliper in accordance with the present invention.

A method of manufacture of brake calipers in accordance with the present invention is described with reference to FIG. 9. A brake caliper design is provided at step 100. The design assumes a solid metal body. The design is input into a CAE (computer aided engineering) stress analysis program in step 102. A load case is also input (e.g. simulating the forces of braking) at step 104. At step 106 the CAE program is run, producing an output at step 108 which provides details of the stress profile of the caliper body under loading.

In the results set, there will be areas of the caliper with high stress and areas with lower levels of stress (far below the strength of the material). The areas of lowest stress are also likely to be those of lowest deformation.

At step 110, the user adapts the CAE model to introduce internal lattice structures at areas in which stress and deformation are low. This effectively lowers the global density of the material in those areas, making the caliper lighter. The model is then rerun at step 112 to check the performance of the lighter caliper. If satisfactory, the remodelled caliper is sent for ALM at step 114.

In an alternative process, optimisation software may perform iterative steps to introduce internal lattice structures. For example, the optimisation software may automatically assign a skinned lattice to areas with stresses in a predetermined range, before rerunning the software. Evidently moving from a solid material to a lattice will increase stress and deformation, and the optimisation software will be programmed not to exceed a given deformation. As described above, optimisation software may use low bulk density lattice to fill a region which may previously have been filled with a thin web.

Figure 10:
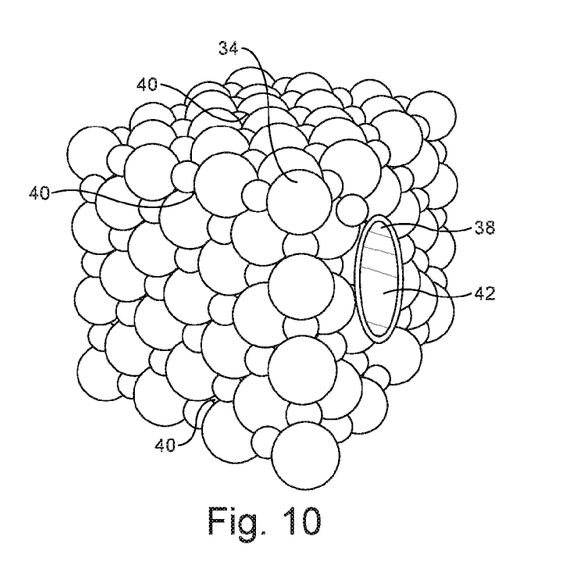
FIG. 10 is a section view similar to FIG. 4 of a sixth embodiment.

FIG. 10 is similar to the arrangement in FIG. 4 except the lattice is a body centred cubic structure. This is advantageous as the structure is self-supporting during the ALM process and comprises small three-dimensional, readily repeatable cells. Cells can be successively miniaturised to fill tighter areas with the lattice.

Figure 11:
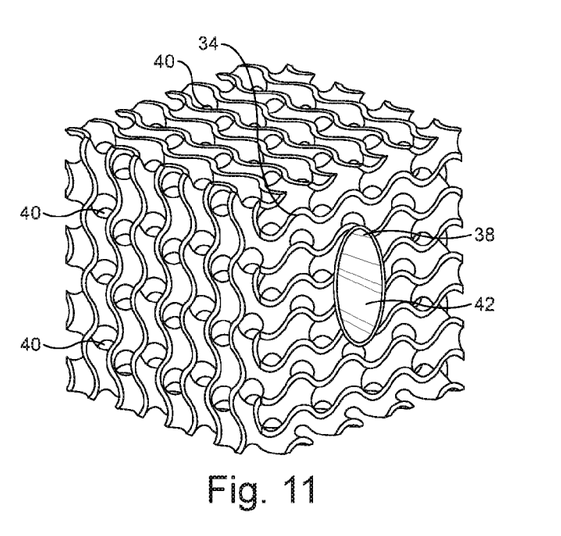
FIG. 11 is a section view similar to FIG. 4 of a seventh embodiment.

FIG. 11 is similar to the arrangement in FIG. 10 but the lattice is a gyroid structure.

Variations fall within the scope of the above embodiments.

In an alternative embodiment, a closed cell structure may be used and the metal powder left inside the caliper body. This still provides a lower weight than solid metal as the powder has a lower density than the fused material.

The invention claimed is:

1. A brake caliper formed by additive layer manufacturing, said caliper comprising a body formed from a single material, whereby the single material comprises, at least in part, a three-dimensional lattice of lattice elements defining voids and having at least a partial skin, in which the body and a high stress region, in which high stress region the lattice has a bulk density of 50% or less of the single material forming the body and a high stress region, in which high stress region the lattice has a bulk density higher than that of the low stress region.

2. A caliper according to claim 1, wherein said lattice is substantially open.

3. A caliper according to claim 2, comprising a drain orifice in communication with the open lattice to allow egress of manufacturing material therefrom.

4. A caliper according to claim 1, wherein said lattice is substantially closed.

5. A caliper according to claim 1, wherein said lattice defines voids disposed symmetrically about the Y-axis.

6. A caliper according to claim 1, wherein the caliper is formed wholly from skinned, three-dimensional lattice.

7. A caliper according to claim 1, wherein the caliper is formed in part from skinned, three-dimensional lattice and in part from solid material.

8. A caliper according to claim 1, wherein said skin defines one or more of a piston bore, a slideway, an abutment for a brake pad, a mounting pad of an upright, a bearing pad for a screw fastener, an exterior surface visible in use, an internal fluid passage, a seat for a fluid seal, a threaded bore, an unthreaded bore.

9. A caliper according to claim 1, the lattice defining voids of different volume.

10. A caliper according to claim 1, the lattice defining voids of substantially the same volume.

11. A caliper according to claim 10, wherein a substantial proportion of said voids are defined by concave surfaces.

12. A caliper according to claim 1, in which the bulk density is 30% or less of the material forming the lattice.

13. A caliper according to claim 1, wherein said lattice is defined by the lattice elements.

14. A caliper according to claim 13, in which the lattice elements take the form of one or more of columns, pillars, dendritic forms, honeycomb structures, body centred cubic structures or gyroid structures.

15. A caliper according to claim 13, wherein said lattice elements have a minimum cross-sectional area of 1 mm$^2$.

* * * * *